Oct. 13, 1970 R. J. MAGGS 3,533,751
LIQUID-LIQUID CHROMATOGRAPHY APPARATUS
Filed Dec. 2, 1968
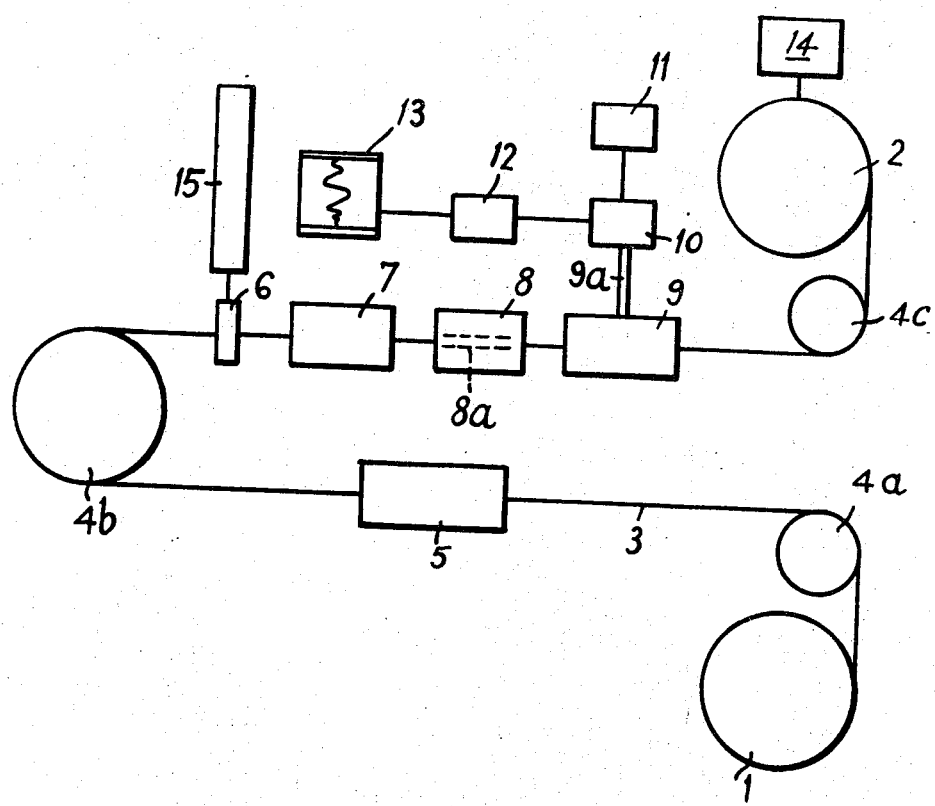

United States Patent Office 3,533,751
Patented Oct. 13, 1970

3,533,751
LIQUID-LIQUID CHROMATOGRAPHY
APPARATUS
Robert J. Maggs, Cambridge, England, assignor to Pye Limited, Cambridge, England, a British company
Filed Dec. 2, 1968, Ser. No. 780,374
Claims priority, application Great Britain, Dec. 13, 1967, 56,740/67
Int. Cl. B01d 15/08
U.S. Cl. 23—253                                    2 Claims

ABSTRACT OF THE DISCLOSURE

This invention relates to liquid chromatographic detection apparatus in which the solutes eluted from a liquid chromatograph column are converted into a derivative suitable for detection by a specific detector sensitive to a particular group or groups of compounds.

---

Chromatographic detection apparatus as described in our British specification No. 998,107 is well established as a monitor for liquid chromatographic columns. Such apparatus incorporates a solid body, e.g. a wire, which is used to carry away continuously as a surface film, a proportion of the effluent from the chromatographic column. At present the detector employs a flame ionisation detector or an argon detector as the sensing device to produce an electrical signal output related to the amount of each solute eluted from the chromatographic column.

According to the present invention, the solutes eluted from a liquid chromatograph column are converted into a derivative suitable for detection by a specific detector sensitive to a particular group or groups of compounds.

According to one form of the invention, the eluted solutes are converted so that they are detectable by an electron capture detector. Thus, the compound or compounds eluted from a liquid chromatograph column are converted into an electron capturing form of those compounds. Such a detector is inter alia suitable for detecting halides and alkyl leads.

An embodiment of the invention will now be described with reference to the accompanying drawing which shows schematically a moving wire liquid chromatographic detector system according to the invention.

Referring to the drawing, the detector comprises spools 1 and 2 between which extends a stainless steel wire 3 passing over pulleys 4a, 4b and 4c. Wire 3 also traverses a cleansing chamber 5, a coating block 6 connected to a liquid chromatographic column 15, a first oven 7, a conversion chamber 8 and a second oven 9. Oven 9 is connected by a gas line 9a to the electron capture detector 10 which is itself electrically connected to pulse generator 11 amplifier 12 and pen recorder 13.

In this embodiment the conversion chamber 8 comprises a pipe or tube 8a of non-corrosive material such as glass through which the wire passes in a dilute atmosphere of 1% fluorine in argon. The ingress and egress holes through which the wire passes are sealed so as not to permit the escape of the fluorine gas solution.

In operation, wire from spool 1 is taken up by spool 2, driven by an electric motor 14, and passes through the apparatus at a steady rate. In passing through the cleansing chamber 5 the wire is subjected to extreme heat, say 800–1000° C. to cleanse its surface and at collection point 6 receives from the column 15 a proportion of the eluted solvent together with any solute which the solvent may be carrying. The eluent is carried into the first oven 7 which is maintained at a temperature sufficient to drive off the solvent yet leave any solute to pass to the conversion chamber 8 where it chemically and/or physically combines with the fluorine gas to produce a fluorinated form of the solute. This passes to the second oven 9 where the temperature is maintained considerably higher than in the first oven and where the fluorinated form of the solute is vapourised or pyrolysed and the vapour or the products of the pyrolysis swept into electron capture detector 10.

In the present embodiment the electrodes of the electron capture detector 10 are fed with the pulses of a duration of approximately 0.5 $\mu$./s.–500 $\mu$/s. inter-pulse-period, these conditions having been shown to permit operation of the detector at optimum sensitivity. Alternatively the detector electrodes may be maintained at a potential difference of between 2 and 20 volts with respect to one another by employing a D.C. power supply in place of the pulse generator 11. The resultant current flow is monitored, amplified by amplifier 12 and fed to a recording device, such as a pen recorder 13, which records a trace corresponding with changes in the electron capture detector current. With a fluorine compound present in the pyrolysis chamber 9 the rate of electron capture and hence the detector current flow is related to the amount of material present and hence to the original amount of the compound solute eluted, the recorded current peak enabling a determination to be made of the amount of solute.

Under optimum conditions a liquid chromatograph detector employing an electron capture detector as a general purposes high sensitivity detector could be $10^2$ or $10^3$ times more sensitive than the same instrument employing a flame ionisation argon detector.

Although the invention has been described with particular reference to the specific detection of fluorine compounds using an electron capture detector, other types of specific detector may be used for other compounds. For example, the eluted solutes may be converted, after evaporation of the solvent, into phosphorus compounds the pyrolysis products of which are fed to a thermionic flame ionisation detector, such as is described in copending application No. 768,788, filed Oct. 18, 1968. Such a detector may be represented by the block 10 and feed the recording device 13 through the amplifier 12. The pulse generator 11 would then be omitted.

I claim:
1. Apparatus including a liquid chromatograph column and means for monitoring the eluent of said liquid chromatograph column to denote the presence of sample components dissolved or suspended in the solvent fluid thereof, said apparatus comprising, in combination, a conveyor, means for advancing the conveyor, means for disposing at least a portion of the eluent from said column upon the conveyor, means including a first heating chamber maintained at a relatively low temperature and traversed by the conveyor for removing the solvent fluid from the conveyor, means including a conversion chamber traversed by the conveyor and containing an excess of halogen for combination with the residue on the con- veyor to produce a halide compound therefrom, means including a second heating chamber maintained at a relatively high temperature and traversed by the conveyor for converting into gas phase at least a portion of the halide compound on the conveyor and means for entraining any gas from the halide compound and conveying it to an electron capture mass detector to produce an indication of the presence of said sample components.

2. Apparatus according to claim 1 in which the halogen is fluorine.

References Cited
UNITED STATES PATENTS 3,128,619  4/1964  Lieberman _____ 73—23.1 X
3,292,420  12/1966  Scott _____ 73—23.1

J. L. DeCESARE, Primary Examiner

U.S. Cl. X.R.

210—198